United States Patent [19]
Yoshimura et al.

[11] Patent Number: 5,860,445
[45] Date of Patent: Jan. 19, 1999

[54] TRANSFER VALVE MANIFOLD

[75] Inventors: Shinichi Yoshimura; Makoto Ishikawa, both of Yawara-mura, Japan

[73] Assignee: SMC Corporation, Tokyo, Japan

[21] Appl. No.: 969,946

[22] Filed: Nov. 25, 1997

[30] Foreign Application Priority Data

Dec. 5, 1996 [JP] Japan .................................. 8-340477

[51] Int. Cl.⁶ .................................................. F15B 13/043
[52] U.S. Cl. .................... 137/269; 137/625.64; 137/884; 251/26
[58] Field of Search .................... 137/269, 625.64, 137/884; 251/26

[56] References Cited

U.S. PATENT DOCUMENTS

| | | | |
|---|---|---|---|
| 3,270,776 | 9/1966 | Carls | 137/625.64 |
| 4,966,196 | 10/1990 | Meyer | 137/625.64 |
| 5,086,803 | 2/1992 | Nakajima . | |

FOREIGN PATENT DOCUMENTS

| | | |
|---|---|---|
| 25 16 438 | 10/1976 | Germany . |
| 64-17078 | 1/1989 | Japan . |
| 1-163270 | 11/1989 | Japan . |
| 1-174684 | 12/1989 | Japan . |

*Primary Examiner*—Gerald A. Michalsky
*Attorney, Agent, or Firm*—Oblon, Spivak, McClelland, Maier & Neustadt, P.C.

[57] ABSTRACT

A manifold 1A that simultaneously supplies a control and pilot fluids to a transfer valve 2 has an internal pilot channel 8 leading to a supply port 4; an external pilot channel 13 leading to an external pilot port X1; and a shuttle valve 11 that selectively guides a pilot fluid to the pilot valve 20 from the internal 8 and external 13 pilot channels. Two input openings 11a, 11b in the shuttle valve 11 are individually connected to the pilot 8 and external pilot 13 channels, while the output opening 11c is connected to the pilot supply channel 6.

9 Claims, 4 Drawing Sheets

TRANSFER VALVE MANIFOLD

FIELD OF THE INVENTION

The present invention relates to a manifold on which a pilot transfer valve is installed, and in particular, to a transfer valve manifold that enables a mounted transfer valve to be used as both internal and external pilot types.

PRIOR ART

Pilot transfer valves belong to the class of transfer valves that switch the flow of pressurized fluid such as compressed air. A pilot transfer valve is composed of a main and pilot valves wherein pilot fluid supplied from the pilot valve acts on a valve member in the main valve to switch the valve member.

Such pilot transfer valves may be individually used but are often installed on a common manifold as a group so as to simultaneously supply a control and pilot fluids to each of the transfer valves through the manifold.

In addition, these transfer valves can be classified into internal and external pilot types depending on the method used to supply pilot fluid. The internal pilot transfer valve guides part of the control fluid (as the pilot fluid) from a supply port in the main valve to the pilot valve, while the external pilot transfer valve guides an exclusive pilot fluid different from the control fluid to the pilot valve through external piping connected to the pilot valve. Either type of transfer valve can be used depending on the working conditions, and the internal pilot type must often be converted into the external pilot type or vice versa depending on changes in the working conditions.

To cope with such cases, a transfer valve has been proposed that can be switched between the internal and external pilot types as disclosed in, for example, Japanese Utility Model Laid Open No. 64-17078, Japanese Utility Model Laid Open No. 1-163270, or Japanese Utility Model Laid Open No. 1-174684.

In the conventional transfer valves, however, a switching means is built directly into a valve body of the transfer valve, thereby increasing the size of the transfer valve and making the structure complicated. In particular, since the valve body of the transfer valve already includes many built-in parts and thus has little free space, it is very difficult in terms of design and manufacturing to newly incorporate the switching means. In addition, the switching means switches between the internal and external pilot types through the manual installation, removal, and replacement of parts, so the switching operation is very cumbersome and requires a large amount of labor and time if there are many transfer valves to be changed. It is also cumbersome to check whether or not all the transfer valves have been switched correctly, and errors of this type create the potential for further, operating errors.

DISCLOSURE OF THE INVENTION

It is a main object of this invention to build a switching means into a manifold in order to avoid increasing the size of the transfer valve and the complexity of the overall structure, and to enable the transfer valve to be used automatically and reliably as either the internal or external pilot type by simply mounting the transfer valve on a manifold.

It is another object of this invention to prevent a pilot fluid from remaining inside the manifold when the valve is switched between the internal and external pilot types, in order to eliminate the effects of the remaining pressure of the pilot fluid.

To achieve these goals, a manifold according to this invention has a common pilot supply channel for supplying pilot fluid to each transfer valve on its installation surface; an internal pilot channel branching from a supply port; and an external pilot channel in communication with an external pilot port, and also has a pilot fluid switching means provided between the internal and external pilot channels and the pilot supply channel for selectively guiding pilot fluid from either the internal or external pilot channel to the transfer valve.

According to a specific embodiment of this invention, the pilot fluid switching means consists of a shuttle valve having two input openings; one output opening; a valve chamber into which the input and output openings are opened; and a shuttle valve member that always allow the input opening on the higher-pressure side to communicate with the output opening while closing the input opening on the lower-pressure side, wherein the two input ports are individually connected to the internal and external pilot channels while the output opening is connected to the pilot supply channel.

Thus, if no pilot fluid is supplied to the external pilot port from the exterior, the input opening on the higher-pressure side leading to the internal pilot channel is opened and communicates with the output opening, whereas the input opening on the lower pressure side leading to the external pilot channel is closed. Thus, pilot fluid is supplied to each transfer valve from the supply port through the internal pilot and pilot supply channels, thereby allowing the transfer valve to operates as the internal pilot type.

On the other hand, when pilot fluid under higher pressure than the control fluid is supplied to the external pilot port from the exterior, the input opening under a higher pressure leading to the external pilot channel in the shuttle valve is connected to the output opening, whereas the input opening under a lower pressure leading to the internal pilot channel is closed. Thus, the pilot fluid is supplied to each transfer valve from the external pilot channel through the pilot supply channel, thereby allowing the transfer valve to operate as the external pilot type.

According to this invention, the pilot fluid switching means may be built directly into the manifold or may be built into an adapter, which is then mounted on the manifold.

When the pilot fluid switching means is built into the adapter, the adapter is desirably mounted adjacent to a transfer valve installation surface on the top surface of the manifold, with the external pilot port formed as part of the adapter and/or the manifold.

DETAILED DESCRIPTION

Figure 1:
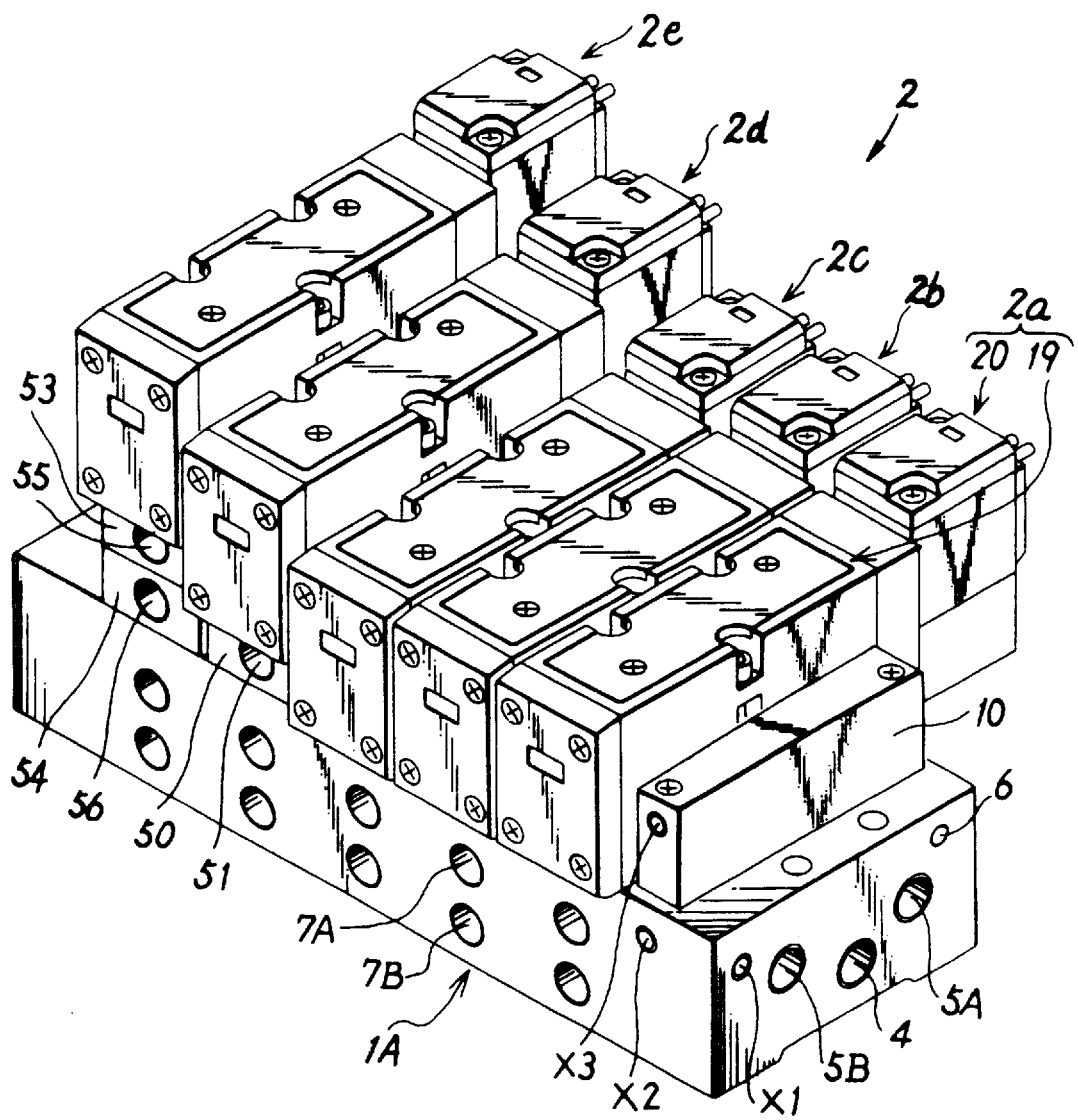
FIG. 1 is a perspective view showing a manifold according to this invention on which transfer valves are installed.
Figure 2:
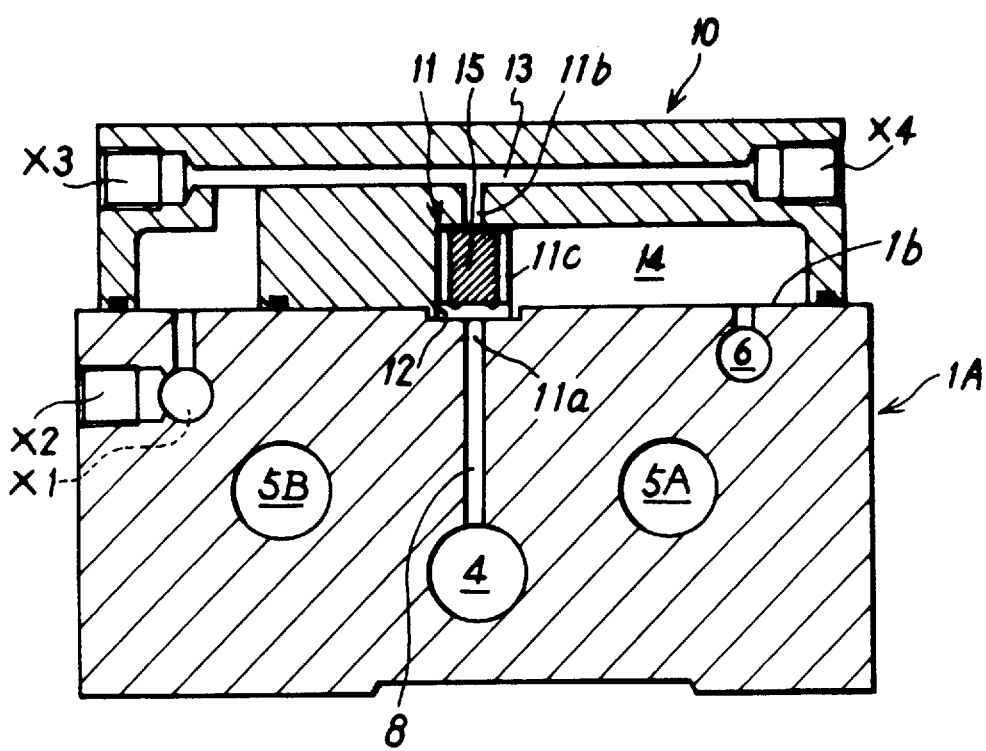
FIG. 2 is an enlarged cross sectional view showing the integral portion of the manifold in FIG. 1 at its adapter mounting position.
Figure 3:
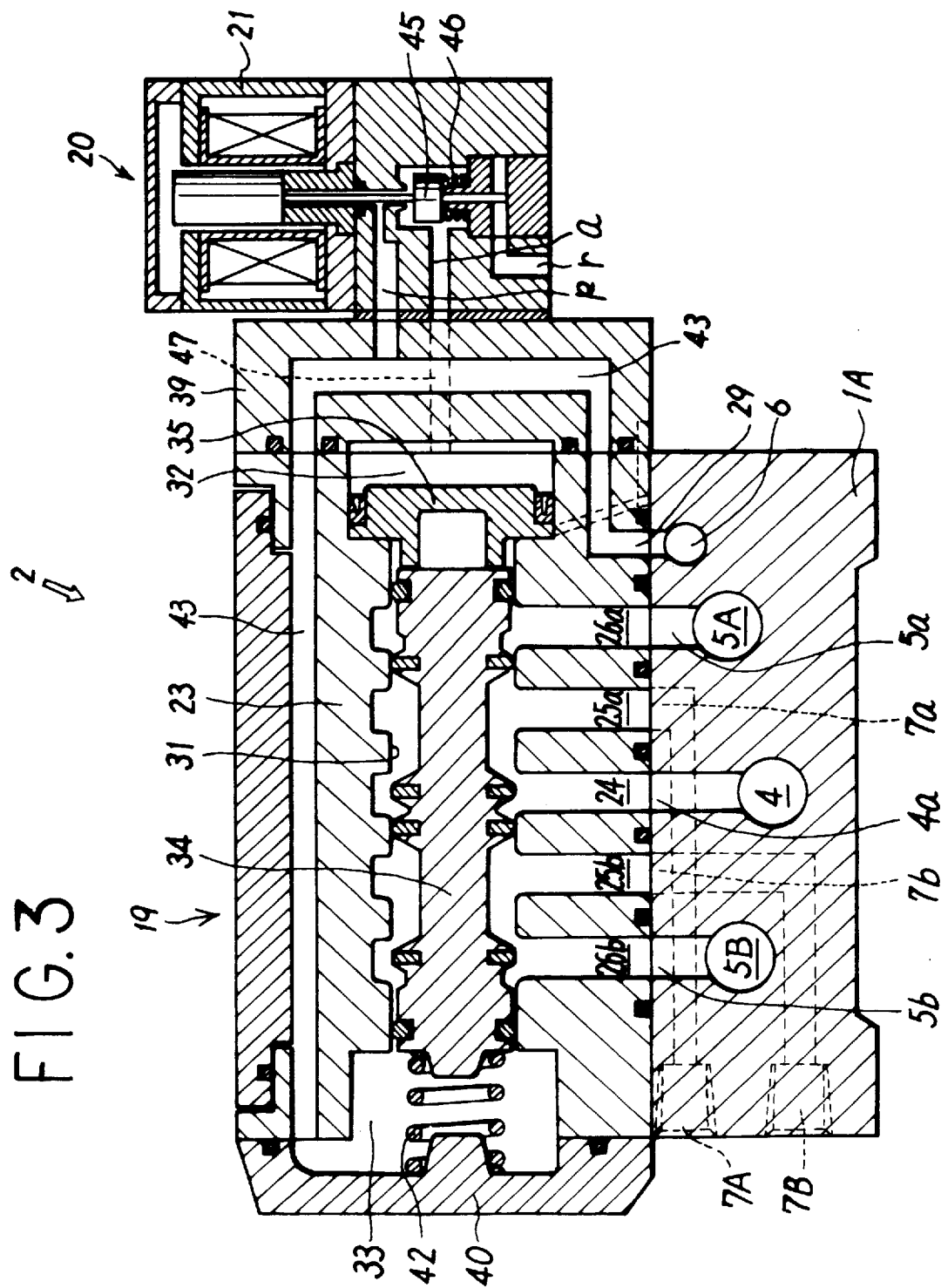
FIG. 3 is an enlarged cross sectional view showing the integral portion of the manifold in FIG. 1 at its transfer valve mounting position.

FIGS. 1 to 3 show a first embodiment of this invention. In these figures, a transfer valve manifold 1A is shaped like a long rectangular parallelopiped and a plurality of transfer valve installation surfaces 1a on which pilot transfer valves 2 are installed are formed and arranged in the axial direction of the manifold.

One supply port 4 that introduces a control fluid such as compressed air from the exterior to supply it to each transfer valve 2 and two ejection ports 5A, 5B (which eject the control fluid from each transfer valve 2 to the exterior) are formed on one end surface of the manifold 1A in its axial direction. These ports 4, 5A, 5B are in communication with a supply through-hole and ejection-holes 5a, 5b on each transfer valve installation surface 1a through a channel extending inside the manifold 1A in its axial direction.

One pilot supply channel 6 that supplies pilot fluid to each transfer valve 2 is formed inside the manifold 1A in its axial direction and is in communication with a pilot supply through-hole 6a opened on each transfer valve installation surface 1a. Caps (not shown) are provided to close both ends of the pilot supply channel.

Furthermore, two output ports 7A, 7B are formed on one side of the manifold 1A in its lateral width direction so as to correspond to each transfer valve 2, and are individually in communication with output through-holes 7a, 7b opened on each transfer valve installation surface 1a.

An adapter mounting surface 1b is formed on the top surface of the manifold 1A and adjacent to the transfer valve installation surface 1a. A rectangular-parallelopiped adapter 10 with a built-in shuttle valve 11 acting as a pilot fluid switching means is mounted on the adapter mounting surface 1b. A plurality of external ports X1, X2, X3, X4 are formed in both adapter 10 and manifold 1A and are in communication with one another through channels. Each of these external pilot ports introduces exclusive pilot fluid from the exterior. In the illustrated example, the four pilot ports X1, X2, X3, X4 are provided on locationally and directionally different surfaces of the adapter 10 and manifold 1A so that a port can be selected to allow piping to be connected thereto depending on the site conditions. The unused ports are closed by plugs. Thus, the following description involves the use of the external pilot port X1.

The shuttle valve 11 selectively guides pilot fluid to each transfer valve 2 from the supply 4 or external pilot X1 port, and has a first and second input openings 11a, 11b opened at opposite positions in a valve chamber 12; one output opening 11c opened into the valve chamber 12 between the input openings 11a and 11b; and a shuttle valve member accommodated in the valve chamber to operate by means of the pressure of fluid flowing in from the input openings to always allow the input opening on a higher-pressure side to communicate with the output while closing the input opening on a lower-pressure side. The first input opening 11a is in communication with the supply port 4 through an internal pilot channel 8, the second input opening 11b is in communication with each external pilot port X1 through an external pilot channel 13, and the output opening 11c is in communication with the pilot supply channel 6 through an out put channel 14.

The "one output opening" herein does not necessarily refer to an opening formed in the valve chamber 12 at one position but includes a plurality of openings formed in the valve chamber 12 and all in communication with the pilot supply channel 6.

The valve chamber 12 in the shuttle valve 11 is formed between a hole formed on the bottom surface of the adapter 10 and the top surface of the manifold 1A, and the opening portion of the internal pilot channel 8 opened on the top surface of the manifold 1A constituting the first input opening 11a.

The transfer valve 2 installed on the manifold 1A is a single pilot 5-port transfer valve comprising a main valve 19 that switches the direction of a control fluid; and a solenoid-driven pilot valve 20.

A valve body 23 of the main valve 19 is a rectangular parallellopiped, and a central supply hole 24, output through-holes 25a, 25b on either side of the supply through-hole 24, and ejection through-holes 26a, 26b on the respective sides of the output through-holes 25a, 25b are provided on the bottom surface of the valve body so as to correspond to each through-hole on the transfer valve installation surface 1a of the manifold 1A. A pilot supply through-hole 29 is also provided on the bottom surface of the valve body.

A valve hole 31 through which the supply through-hole 24 and the output 25a, 25b and ejection 26a, 26b through-holes are in communication with one another is provided in the valve body 23 in its axial direction, and a main valve member 34 that switches the channel among the through-holes is slidably inserted into the valve hole 31.

A piston chamber 32 is formed at one end of the valve hole 31 between the valve body and a sub-block 39, and a piston 35 with a larger diameter than the main valve member 34 is slidably inserted into the piston chamber 32. A return chamber 33 is formed at the other end of the valve hole 31 between the valve body and an end plate 40, and a return spring 42 with a small urging force is installed and compressed between the main valve member 34 and end plate 40.

A pilot channel 43 that connects the pilot supply through-hole 29 to a pilot supply opening (p) in the pilot valve 20 is formed inside the valve body 23 and sub-block 39, and extends through the valve body 23 to communicate with the return chamber 33. In addition, a different pilot output channel 47 is formed in the sub-block 39 to allow the piston chamber 32 to communicate with a pilot output opening (a) in the pilot valve 20.

The pilot valve 20 is configured as a normal closed 3-port solenoid valve comprising a pilot valve member 45 that allows the pilot supply opening (p), a pilot output opening (a), a pilot ejection and output opening (r), and the pilot output opening (a) to communicate with a pilot supply (p) or pilot ejection and output (r) opening; and a return spring 46 that urges the pilot valve member 45 in the direction in which the pilot supply opening is closed. When the solenoid is energized, the pilot valve member 45 allows the pilot supply opening (p) to communicate with the pilot output opening (a). When the solenoid 21 is de-energized, the urging force of the return spring 46 causes the pilot valve member 45 to return to the illustrated state, thereby allowing the pilot output opening (a) to communicate with the pilot ejection and output opening (r).

In the first embodiment, while no pilot fluid is introduced from the external pilot port X1 provided in the manifold 1A, each transfer valve operates as the internal pilot type, whereas when pilot fluid is introduced from the external pilot port X1, it acts as the external pilot type.

Since part of the control fluid is always supplied to the first input opening 11a in the shuttle valve 11 from the supply port 4 through the internal pilot channel 8, if no pilot fluid is supplied to the external pilot port X1 from the exterior, the shuttle valve member 15 opens the first input opening 11a under a higher pressure leading to the internal pilot channel 8 to allow it to communicate with the output opening 11c while closing the second input opening 11b under a lower pressure leading to the external pilot channel 13. Thus, since pilot fluid from the supply port 4 is supplied to each transfer valve 3 from the output channel 14 through the pilot supply channel 6, the transfer valve 2 operates as the internal pilot type.

On the other hand, when pilot fluid under higher pressure than the control fluid is supplied to the external pilot port X1 from the exterior, the shuttle valve member 15 is switched to the position opposite to that described above, to allow the output opening 11c to communicate with the second input port 11b under a higher pressure leading to the external pilot channel 13 while closing the first input opening 11a under a lower pressure leading to the internal pilot channel 8. Thus, since the pilot fluid is supplied to each transfer valve from the external pilot port X1, the transfer valve acts as the external pilot type.

The operation of each transfer valve 2 is the same as that of a publicly known single pilot 5-port transfer valve, so a description of these valves is omitted.

In this manner, each transfer valve can be automatically, simultaneously, and reliably switched between the external and internal pilot types by determining whether or not pilot fluid is to be supplied through the external pilot port X1. This configuration eliminates the need to perform a manual switching operation as in conventional transfer valves, thereby preventing operating errors.

In addition, when the supply 4 and external pilot X1 ports are opened to the exterior, the pilot fluid is ejected and does not remain contained within the shuttle valve 11 or any channel. Consequently, this invention is not affected by a remaining pressure even if another source of fluid under a different pressure is connected to the supply 4 and external pilot X1 ports.

In FIG. 1, transfer valves 2a, 2b, 2c of the five transfer valves 2 mounted on the manifold 1A are directly mounted thereon to operate as a central supply type in which a control fluid is supplied to the central supply through-hole 24 from the supply port 4.

In addition, a fourth transfer valve 2d is mounted on the manifold 1A via a channel change plate 50 so that the supply through-hole 24 is shut off from the supply through-hole 4a on the manifold 1A while communicating with a second supply port 51 provided in the plate 50 and through which fluid under a different pressure is supplied. The connections among the other channels remain unchanged.

Furthermore, a fifth transfer valve 2e is mounted on the manifold 1A via two channel change plates 53, 54 so as to be converted into a dual-end supply type. The upper plate 53 shuts the supply through-hole 24 in the transfer valve 2e off from the supply through-hole 4a in the manifold 1A while allowing it to communicate with an ejection port 55 in the plate 53, whereas the lower plate 54 shuts the ejection through-holes 26a, 26b in the transfer valve 2e off from the ejection through-holes 5a, 5b in the manifold 1A while allowing them to communicate with a third supply port 56 in the plate 54. As a result, in the transfer valve 2e, a control fluid is supplied through the ejection through-holes 26a, 26b at both ends and ejected from the central supply through-hole 24.

Figure 4:
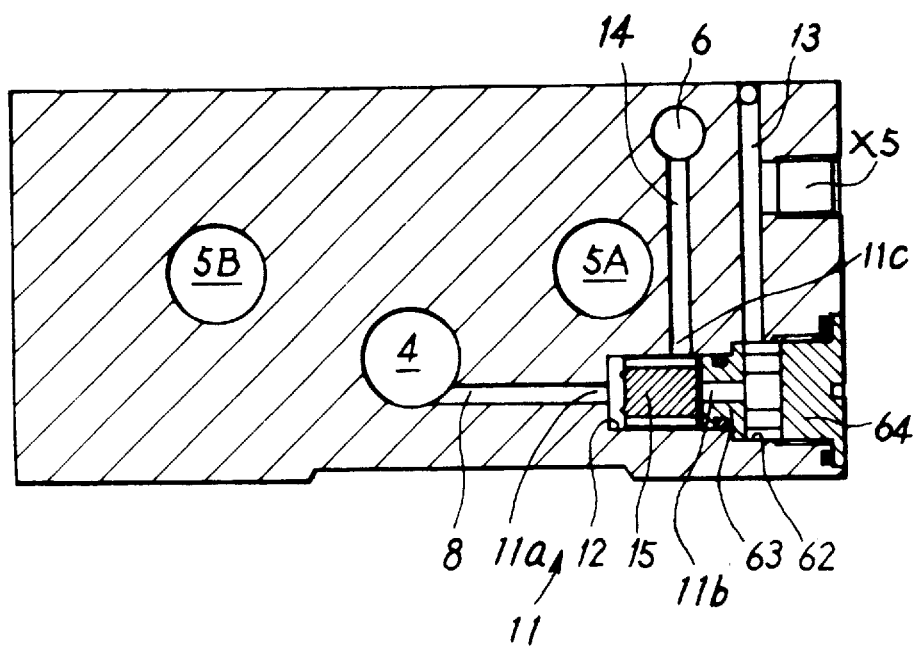
FIG. 4 is a cross sectional view showing a second embodiment of a manifold according to this invention.

FIG. 4 shows a second embodiment of this invention that differs from the first embodiment in that the shuttle valve 11 constituting a pilot fluid switching means is directly built into the manifold 1B. A hole 62 is cut in the rear surface of a manifold 1B, a valve chamber 12 is formed between the tip of a member 63 mounted in the hole 62 and the inner end of the hole 62, and the shuttle valve member 15 is disposed in the valve chamber 12. The first input opening 11a is in communication with the supply port 4 through the internal pilot port provided in the valve body 23, the second input opening 11c is in communication with the external pilot port X5 through the external pilot channel 13 provided in both member 36 and valve body 23, and the output opening 11c is in communication with the pilot supply channel 6 through the output channel 14.

In this case, a plurality of external pilot ports X5 may also be provided in different surfaces of the manifold 1B or the inlet of the hole 62 may be used as an external pilot port.

The other configuration and effects of the second embodiment are substantially the same as those of the first embodiment, so the same components have the same reference numerals as in the first embodiment and their description is omitted.

Although the manifold shown in each of the above embodiments is used to mount 5-port transfer valves thereon, this invention is also applicable to manifolds on which 3-port transfer valves are mounted. In this case, the manifold includes a supply port, one ejection port, and one output port, and has on each transfer valve installation surface, a supply through-hole, one output through-hole, and one ejection through-hole that are in communication with the above ports. The pilot supply channel and pilot supply through-hole are provided as in the manifold for 5-port transfer valves.

In addition, although, in the illustrated example, the output port is provided in the manifold, it may also be provided in each transfer valve to eliminate the output through-hole through the top surface of the manifold and the bottom surface of the transfer valve.

As described above, this invention builds the pilot fluid switching means into the manifold to prevent the transfer valve from growing larger and the complexity of its structure from increasing, as in a switching means built into the transfer valve, thereby enabling smaller manifold transfer valves to be obtained.

In addition, each transfer valve can be automatically, simultaneously, and reliably switched between the external and internal types by determining whether pilot fluid is to be supplied through the external pilot port. Consequently, this configuration eliminates the need to perform a manual switching operation, thereby preventing operating errors.

Furthermore, when the supply and external pilot ports are opened to the exterior, the pilot fluid is ejected and does not remain contained within the shuttle valve or any channel. As a result, this invention is not affected by a remaining pressure even if a source of a different fluid at a different pressure is connected to the supply and external pilot ports.

What is claimed is:

1. A transfer valve manifold comprising:
   at least one transfer valve installation surface on which a pilot transfer valve is installed;
   a supply and ejection ports common to each transfer valve that are in communication with a supply and ejection through-holes on said installation surface and that supply and eject a control fluid to and from each transfer valve through these through-holes;
   a pilot supply channel common to each transfer valve that is in communication with a pilot through-hole on said installation surface and that supplies pilot fluid to each transfer valve through the pilot through-hole;
   an internal pilot channel branching off from said supply port;
   an external pilot port that introduces pilot fluid from the exterior and an external pilot channel leading to the external pilot port; and pilot fluid switching means provided between said internal and external pilot channels and said pilot supply channel for selectively guiding pilot fluid from either the internal or external pilot channel, wherein said pilot fluid switching means includes a shuttle valve having two input openings, one output opening, a valve chamber into which the input and output openings are opened, and a shuttle valve member accommodated in the valve chamber and operating by means of the pressure of pilot fluid flowing in from said input openings to always connect the input opening on a higher-pressure side to the output opening while closing the input opening on a lower-pressure side, and wherein said two input openings are individually connected to the internal and external pilot channels while the output opening is connected to the pilot supply channel.

2. A manifold according to claim 1 wherein said pilot fluid switching means is built directly into the manifold.

3. A manifold according to claim 1 wherein said pilot fluid switching means is built into an adapter, which is mounted in the manifold.

4. A manifold according to claim 3, wherein said adapter is mounted on an adapter mounting surface formed adjacent to the transfer valve installation surface of the top surface of the manifold, and wherein said external pilot port is formed in the adapter.

5. A manifold according to claim 4, wherein a plurality of external pilot ports are formed on directionally different surfaces.

6. A manifold according to claim 3, wherein said adapter is mounted on an adapter mounting surface formed adjacent to the transfer valve installation surface of the top surface of the manifold, and wherein said external pilot port is formed in the manifold.

7. A manifold according to claim 6, wherein a plurality of external pilot ports are formed on directionally different surfaces.

8. A manifold according to claim 3, wherein said adapter is mounted on an adapter mounting surface formed adjacent to the transfer valve installation surface of the top surface of the manifold, and wherein said external pilot port is formed in the adapter and the manifold.

9. A manifold according to claim 8, wherein a plurality of external pilot ports are formed on directionally different surfaces.

* * * * *